United States Patent [19]
Yang et al.

[11] Patent Number: 6,001,519
[45] Date of Patent: Dec. 14, 1999

[54] HIGH MOLECULAR WEIGHT INFORMATION RECORDING MEDIUM AND RELATED DATA WRITING METHOD

[75] Inventors: Arnold Chang Mou Yang, Bao Shan; Yung-Shi Lin, Yeoug Her; Ming-Fa Hsieh; Shih-Tung Cheng, both of Hsinchu; Min-Chieh Chou, Taipei, all of Taiwan

[73] Assignee: Industrial Technology Research Institute, Taipei, Taiwan

[21] Appl. No.: 09/108,959

[22] Filed: Jul. 2, 1998

Related U.S. Application Data

[63] Continuation of application No. 08/787,130, Jan. 22, 1997, abandoned.

[51] Int. Cl.$^6$ ........................................ H01J 3/14
[52] U.S. Cl. ........................... 430/20; 369/126; 365/112; 250/306
[58] Field of Search ............... 369/126; 365/112; 430/20; 250/306

[56] References Cited

U.S. PATENT DOCUMENTS

| | | | |
|---|---|---|---|
| 4,240,712 | 12/1980 | Thirant | 349/20 |
| 4,859,876 | 8/1989 | Dirk et al. | 385/122 |
| 4,886,718 | 12/1989 | Eich et al. | 430/20 |
| 4,971,416 | 11/1990 | Khanarian et al. | 385/122 |
| 5,110,698 | 5/1992 | Hara et al. | 430/20 |
| 5,308,974 | 5/1994 | Elings et al. | 250/306 |
| 5,384,221 | 1/1995 | Savant et al. | 430/270.15 |
| 5,439,777 | 8/1995 | Kawada et al. | 430/945 |
| 5,607,799 | 3/1997 | Moerner et al. | 430/1 |

FOREIGN PATENT DOCUMENTS 63-261234  10/1963  Japan.

OTHER PUBLICATIONS

Sheats, James R., "Imaging and Modification of Nonconducting Polymer Films by the Scanning Tunneling Microscope", Langmuir vol. 10, pp. 2044–2051, 1994.

"Nonlinear Optical Properties of Advanced Materials", *SPIE—i The International Society for Optical Engineering*, Jan. 20–21, 1993.

*Primary Examiner*—Martin Angebranndt
*Attorney, Agent, or Firm*—Bacon & Thomas

[57] ABSTRACT

An information recording medium including a substrate, an intermediate conductive layer, and a high molecular weight layer. When the high molecular weight layer is heated to close to its glass (transition) temperature by applying an AC field in order to induce thermal motion in molecular electric coupling poles present in the high molecular weight layer, the coupling poles are polarized by an external electric field applied between a microscopic probe tip and the intermediate conductive layer, the polarization becoming fixed when the temperature of the layer drops.

4 Claims, 3 Drawing Sheets

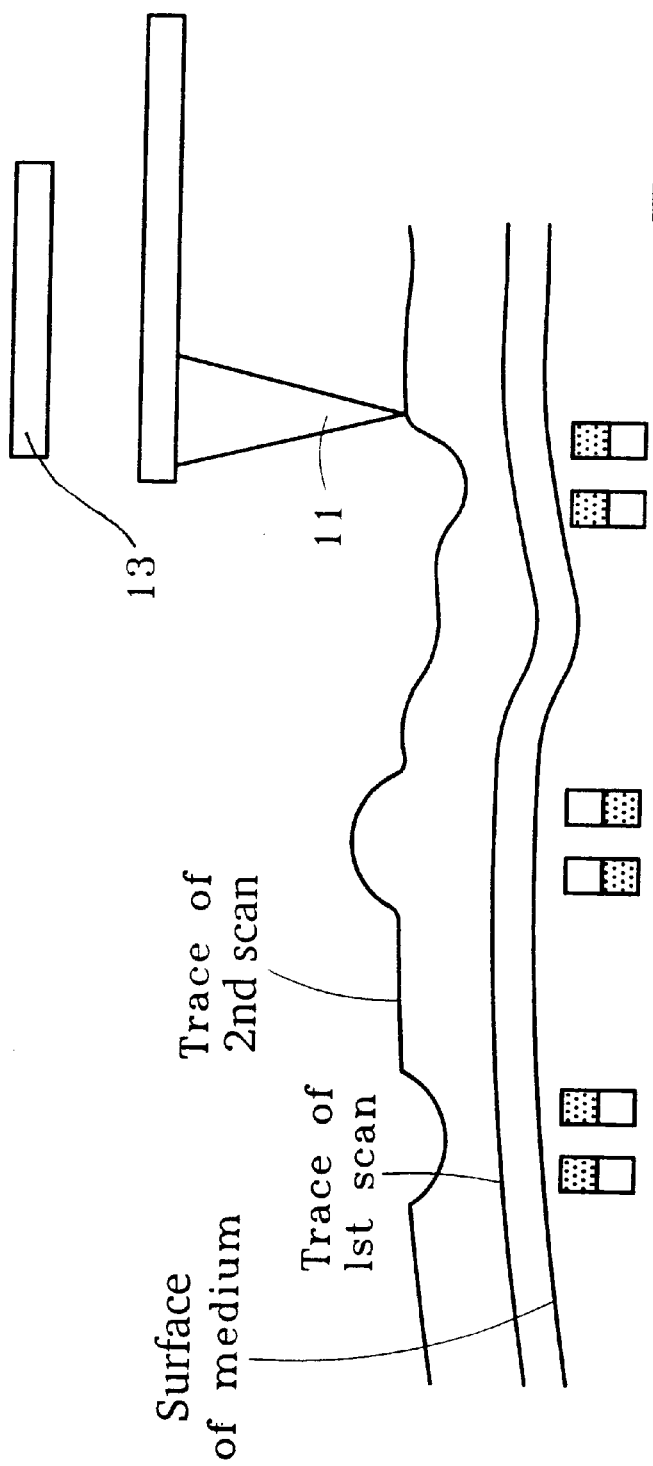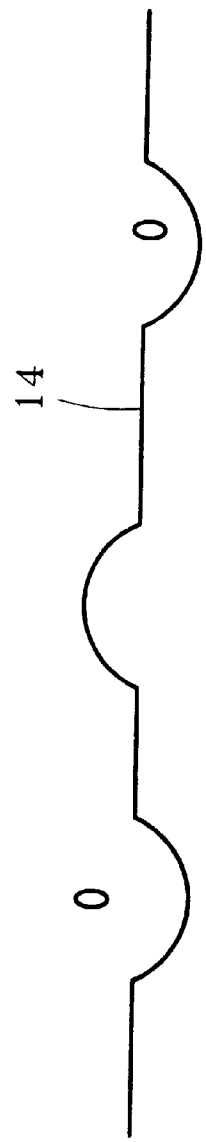

HIGH MOLECULAR WEIGHT INFORMATION RECORDING MEDIUM AND RELATED DATA WRITING METHOD

This application is a continuation-in-part of U.S. patent application Ser. No. 08/787,130, filed Jan. 22, 1997, now abandoned.

BACKGROUND OF THE INVENTION

The present invention relates to information recording media, and more particularly to a high molecular weight information recording medium which permits data bits to be written when the medium is heated to its glass (transition) temperature and polarized. The invention relates also to the method of writing data bits in such a high molecular weight information recording medium.

As a result of recent developments in electronic and telecommunications technology, the demand for high density recording (information storage) media has greatly increased. Currently, magnetic disks, CD-ROMs, and DVD-ROMs are most commonly used for storing data bits. Writing and reading data bits in these recording media are commonly achieved by means of the application of an electric field or be varying the optical characteristics of the medium. However, because of the limitations of mechanical precision and wavelength, it is difficult to improve the recording density of such recording media. In order to meet the demand for high density recording media, most recording media designers and manufacturers have invested a lot of money in developing ultra high density recording media suitable for repeatedly writing and reading data bits. The result has been the development of microscope scanning probe type storage technology, which involves using a microscopic scanning probe as the center of the writing mechanism for processing the material surface directly, so as to write information data in the recording medium by changing the number of the molecules, atoms, or electric charges. By means of this general method, the storage density can be greatly improved, for example, to several hundred times that of conventional CD-ROMs (several G bits/in$^2$ to thousands of G bits/in$^2$), which greatly reduces the unit cost of the medium.

There are several known methods of using a microscope scanning probe to write data bits in a recording medium. These methods include the thermo-mechanical data storage method, the charge storage method, and the gold dot storage method, summaries of which follow:

1. The Thermo-mechanical Data Storage Method

According to this method, a microscope scanning probe is adhered to a piezoelectric driving device, and the recording medium, which is usually in the form of a disk, is put on a low-speed precision air bearing. The speed of the air bearing relative to the microscope scanning probe is about 10–100 mm/s. A laser diode of 30 mW is focused onto the atomic force microscope scanning probe to increase its temperature to a level sufficient for softening the disk, and then the probe is driven by a piezoelectric ceramic at the end thereof to press out a mark on the disk.

The size of the mark is less than approximately several hundred angstoms, and the mark is composed of a pit surrounded by a ridge which is formed from the material displaced by the tip of the probe. This pattern represents a density of about 25 G bits/in$^2$, a more than 20 times increase in area density compared with conventional optical recording. However, this method can only write data bits in the same disk for one time, and does not allow the storage data bits to be modified. Another drawback of this method is that the coarseness tolerances for the disk surface are extremely low. Furthermore, this method is subject to dust protection and vibration problems.

2. The Charge Storage Method

This method involves making a mark on the recording medium by concentrating the electric charges of a particular material on a particular area by means of an electric field. When reading, a small voltage is applied to between the probe and the recording medium. Because of the effect of the static electricity of electric charges in the recording material, the previous record is read out when scanning. Because the tip of the probe is tiny (on the order of several angstroms or several tens of nanometers), the data density is high. An example of this method is found in U.S. Pat. No. 5,216,661, entitled "ELECTRON DENSITY STORAGE DEVICE USING A STM". This method can achieve ultrahigh density data writing and reading requirements. However, the recording medium is not stable and is vulnerable to temperature variations, background radiation, light rays and humidity. As a result, data stored on this type of medium cannot be kept for long (about several weeks only). Furthermore, because the organometallic material for the recording medium is obtained through a special extracting or synthesizing technique, manufacture of the recording medium is not easy.

3. The Gold Dot Storage Method

According to this method, the microscope scanning probe is coated with a layer of gold, and a negative voltage is applied to the disk, which is made from silicon, causing gold atoms at the tip of the probe to be evaporated and adhered to the disk. Because the tip of the microscope scanning probe is tiny, and the number of atoms evaporated is small, a large number of tiny gold dots can be formed on the surface of the disk. Through a proper selection of the probe size, and proper settings of the voltage value, the actuating time and the contact force, minimized gold dots can be achieved. The storage density of this method can reach 100 G bits/in* or even 1 T bits/in*. However, this method wastes a lot of gold atoms, and therefore the service life of the probe is short. Furthermore, this method will change the surface profile of the recording material, preventing repeated storage.

SUMMARY OF THE INVENTION

The present invention has been accomplished in view of the above circumstances.

According to one aspect of the present invention, a high molecular weight recording medium is provided for recording information data. The high molecular weight recording medium is made up of a high molecular weight layer covering one side of a substrate of certain rigidity, and an intermediate electrically conductive layer retained between the substrate and the high molecular weight layer. When the high molecular weight layer is heated to its glass (transition) temperature, the molecular electron coupling poles that couple the high molecular weight chains are polarized by an electric field extending between an external electrode and the intermediate electrically conductive layer, the polarization being stably maintained when the temperature drops, allowing data bits to be written in the information recording medium and stored.

According to another aspect of the invention, heating of the high molecular weight layer is carried out by generating a dynamic electric field between the electrode and the intermediate electrically conductive layer.

Because the polarization resulting from the method of the present invention is not subject to interference from external electric fields after the temperature of the high molecular weight recording medium has dropped to room temperature, storage data can be maintained intact for a long time. In addition, a protective layer may be added to further protect the high molecular weight layer.

According to another aspect of the present invention, a method of writing data bits in a high molecular weight recording medium includes a first step of heating the high molecular weight recording medium to its glass (transition) temperature, and a second step of polarizing the electron coupling poles in the heating area and then writing in a data bit by means of an external electrode and the intermediate conductive layer.

According to still another aspect of the present invention, the writing method of the invention further including a third step of cooling the high molecular weight recording medium to room temperature, so as to ensure the stability of the polarized electric dipoles in the medium.

BRIEF DESCRIPTION OF THE DRAWINGS

FIGS. 2C and 2D are schematic drawings explaining the step or reading data from the high molecular weight recording medium of the preferred embodiment.

DETAILED DESCRIPTION OF THE PREFERRED EMBODIMENT

Figure 1:
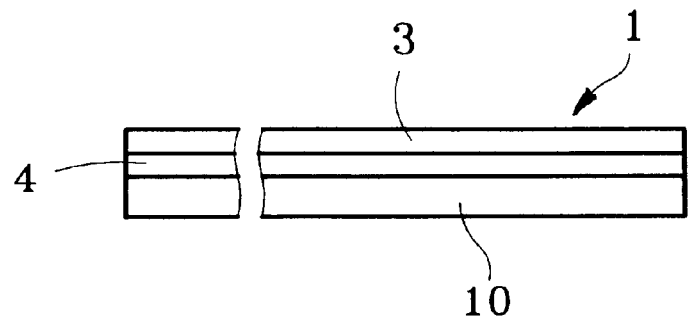
FIG. 1 is a side view of a high molecular weight recording medium having an intermediate electrically conductive layer according to a preferred embodiment of the present invention.
Figure 2A:
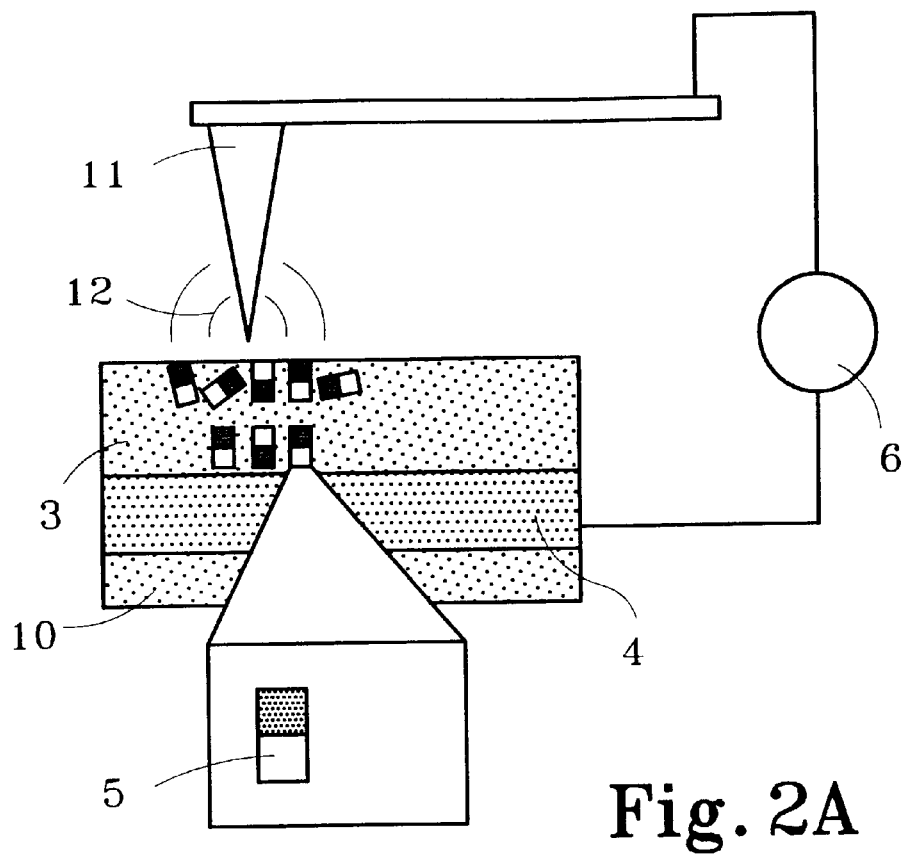
FIGS. 2A and 2B are schematic drawings explaining the steps of writing data to the high molecular weight recording medium of the preferred embodiment by means of a probe tip-based data storage arrangement in the preferred embodiment shown in FIG. 1.
Figure 2B:
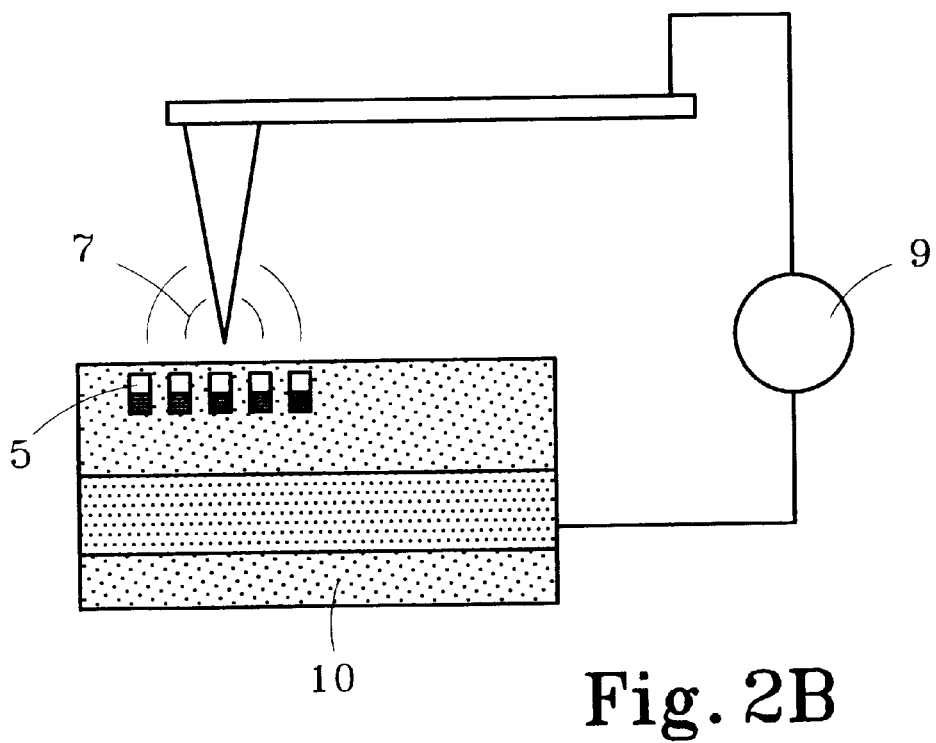

Referring to FIGS. 1, 2A, and 2B, a recording (information storage) medium 1 includes a layer 3 made from a high molecular weight material such as acrylic, plastic, or polymethyl methacrylate (PMMA), a substrate 10 made from electrically insulative material, for example, silicon sheet, and intermediate conducting layer 4 made from metal having a high conductivity. The surface of the substrate 10 onto which the intermediate conducting layer 4 is covered must be a smooth surface.

In an especially preferred embodiment of the invention, layer 3 is made from conventional PMMA having a molecular weight of 790 k and a thickness of 50 nm to 200 nm. Initially, as shown in FIG. 2A, layer 3 contains chains of high molecular weight atoms. Coupling together and already present between the chains of high molecular weight atoms are randomly aligned electron coupling poles 5 having a small charge that can be changed by an external electric field 7, shown in FIG. 2B. When under a normal state (room temperature), the electron coupling poles 5 do not move even when subject to the external electric field, and therefore the electron coupling poles 5 are stable under a normal state. However, when the temperature of the high molecular weight material reaches its glass (transition) temperature, the electron coupling poles 5 become unstable. If the external electric field 7 is produced at this stage, the arrangement of the electron coupling poles 5 will be forced to change subject to the direction of the external electric field and therefore become polarized or aligned. Then, when the temperature drops to room temperature again, the polarized arrangement of electron coupling poles 5 becomes fixed, causing the small charge to be produced in such a direction. The small charge forms a data unit of a record written in the storage medium and stored therein. Because the electron coupling poles 5 are of molecular and atomic scale, the written-in record (electronic signal) is extremely small. For example, for a probe tip of 10 nm to 50 nm diameter, the area of the polarized coupling poles 5 can be caused to have a diameter of less than 50 nm, resulting in a recording density that is several hundred times superior to that of a CD-ROM, and as much as 100 times that of a DVD-ROM. The smaller the probe tip, the higher the recording density.

The method of writing data in the recording medium 1 thus involves the following steps:

i) heating the recording medium 1 to the glass (transition) temperature of its high molecular weight material 3 (see FIG. 2A); and ii) polarizing the heated area (see FIG. 2B) in order to form a data unit or record in the recording medium 1 by means of the polarity of the polarized area.

The heating of the step i) is preferably a local area heating, as shown in FIG. 2A, although full area heating (not shown) is also possible. In particular, heating may be carried out by applying an alternating current generated by AC source 6 to a probe 11, the alternating current forming a dynamic electric field 12 between the probe and the intermediate layer, which causes the electron coupling poles in the high molecular weight layer to vibrate and heat the material to above the glass temperature at which the electron coupling poles become free to move and therefore align with the subsequently applied writing field. Preferably, the voltage of the alternating current is 1 to 5 volts and the frequency is 400 to 600 MHz.

In order to use the electric field to heat the high molecular weight recording medium 1, it is necessary to move the probe 11 over the recording medium. This can be accomplished by using a moving device of the type commonly used in regular scanning-probe microscopes, which forms no part of the present invention.

Referring to FIG. 2B again, following heating, the probe is switched to a voltage generator 9 that can be controlled to produce a stable electric field (for example, a DC electric field) between the electrodes probe tip and the conductive layer 4. This stable electric fields pulls the electron coupling poles 5 in the recording medium 1 in a particular direction. When the electron coupling poles 5 are pulled to the designated direction, the polarization procedure is done, and the temperature of the recording medium 1 is lowered. After the temperature is lowered, the arrangement of the electron coupling poles 5 stays unchanged until the medium is once again heated during another write operation. Preferably, the direct current in applied for 0.2 ms, after which the temperature of the electron coupling poles has dropped sufficiently to prevent the coupling poles from randomly rearranging themselves. When the temperature is below the glass temperature of the high molecular material, the electron coupling poles will retain their unidirectional arrangement and charge diffusion will be prevented.

Reading data bits in the recording medium 1 is preferably achieved, in the embodiment of FIGS. 2C and 2D, by a probe having a diameter of 10 nm to 50 nm, which is disposed 20 nm to 300 nm above the surface of the medium to read the polarity of the polarized electron coupling poles 5. When a moving device is controlled using the well-known techniques of scanning electric field microscopy to move the probe tip over every record (data bit) in the recording medium 1, a small voltage is induced in the probe tip. The voltage of the probe tip and the charge of the record or data bit will attract each other when they have a same polarity, or repulse each other when they have a different polarity, and by means of this attraction and repulsion, the value of the record (data bit) 14 is read out.

Preferably, in order to cancel out the effect of irregularities in the surface of the high molecular weight layer 3, the probe first scans the surface of the medium, using a vertical displacement sensor 13 to record the vertical distance between the probe and the medium. Then, the probe is raised to a higher position at least 100 nm from the surface and performs a second scan, as also shown in FIG. 2C. At this time, the probe also scans the medium by taking into account the distance from the medium using the vertical displacement sensor 13. By subtracting the vertical displacement recorded during the first scan from that measured during the second scan, the effects of irregularities in the surface of the recording medium can be accounted for.

Figure 3:
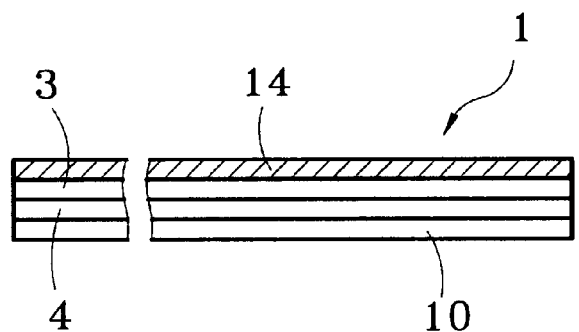
FIG. 3 is a side view of a high molecular weight recording medium with an additional protective layer according to a variation of the preferred embodiment of the invention.

FIG. 3 shows a variation of the embodiment of FIGS. 1, 2A, and 2B, in which the recording medium 1 includes a protective layer 14 covering the high molecular weight layer 3 to protect the recording medium 1 from an improper use, or an impact. The heating and polarization procedures of this structure of recording medium 1 are similar to those described above.

Figure 4:
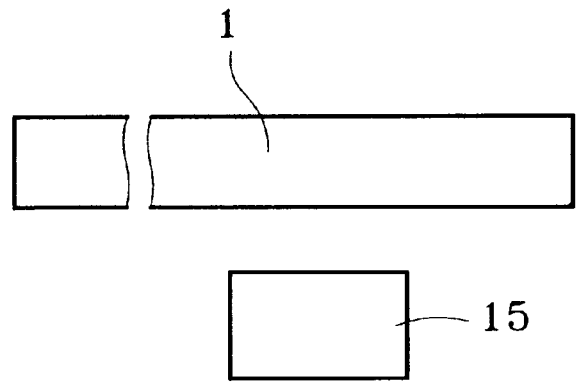
FIG. 4 is a schematic drawing of an apparatus for carrying out the third step of the writing method of the present invention, by cooling the recording medium following heating and polarization of the electric dipoles.

In order to improve writing efficiency, a step iii) may follow the aforesaid step ii) of polarizing the electron coupling poles in the recording medium 1. This third step is to cool down the polarized area. As shown in FIG. 4, a temperature control device 15 may be disposed below the recording medium 1, and controlled to rapidly drop the temperature of the polarized area in the recording medium 1 when the stabilized electric field is removed.

In order to improve the efficiency in writing data bits in the recording medium 1, the whole area of the recording medium could be heated during step i), with step ii) being continuously employed. This method greatly save the time of the step i), but if an eddy current heat source or any heat source which produces an electric field for heating is used under this condition, the written data may be damaged. Therefore, the type of the heat source must be carefully selected. On the other hand, in the embodiments described above, since the probe tip used to perform heating may be the same as the one used to perform writing, the heating area is the writing area, and the aforesaid problem does not occur, although this method is less efficient in terms of recording time than the whole area heating method.

One way to combine the efficiency of the whole area method and the effectiveness of the above-described local heating method is to first heat the whole area of the recording medium 1 to a temperature lower than its glass (transition) temperature, and then heat a local area of the recording medium 1 to the glass (transition) temperature using the above-mentioned AC current applied through the probe tip, followed by the polarization step. This two-step heating method eliminates the problem of damaging the written area in the recording medium 1. Because the local heating procedure and the polarizing procedure are performed through the probe tip, no additional installation cost is involved.

As indicated above, the radius of curvature of the tip of the probe 11 can reach 400 angstroms (pyramidal type), or 200 angstroms (conical type). When specially processed, the radius of curvature of the tip of the probe can reach 100 angstroms. Therefore, the electric field can be applied to a very small area, close to or at molecular scale typically few hundred angstroms. If this small area is designated as one writing (recording) area, the density of the recording medium will be about six hundred times that of a regular CD-ROM, so that the capacity of one recording medium 1 of size equal to one regular CD-ROM is approximately equal to the total capacity of 600 CD-ROMs. Therefore, much data can be stored in a less storage space.

The recording medium 1 can be made in the form of a commercially available disk (see FIG. 1), and rotated for continuous writing and reading of data bits, so that the probe needs to be moved in radial direction only.

Because the high molecular weight material of the recording medium 1 is obtained from a commonly available high molecular weight material such as PMMA having the aforesaid electron coupling poles and the related characteristics, the material cost of the recording medium 1 is low. Also, because the procedure of writing and reading data bits in the recording medium 1 is based on the polarizability of the medium at the glass (transition) temperature, the writing procedure is easy, and because of the inclusion of the intermediate conductive layer, the scanning mechanism can be simplified. Erasing data bits in the recording medium 1 can be done simply by increasing the temperature of the recording medium 1 to the glass (transition) temperature and then applying an electric field to the recording medium 1. Because the storage of data bits in the recording medium is done by means of high molecular weight glass phase transfer, storage data can be maintained for long time.

It is to be understood that the drawings are designed for purposes of illustration only, and are not intended as a definition of the limits and scope of the invention disclosed.

We claim:

1. A method of writing data bits in a high molecular weight recording medium, comprising the steps of:

heating a high molecular weight material to its glass (transition) temperature by applying an alternating current to a scanning electron microscopic probe tip in order to cause magnetic coupling poles in the high molecular weight material to vibrate and thereby heat the material, wherein said high molecular weight material is made up of chains of molecules electrically coupled by electron coupling poles; and polarizing the heated area of the high molecular weight recording medium by applying a polarizing electric field to the heated area, the polarizing electric field being formed between the scanning electron microscopic probe tip and an intermediate conductive layer sandwiched between the high molecular weight layer and a substrate, whereby said polarizing electric field causes alignment of said electron coupling poles with said polarizing electric field to thereby form a data bit in the polarized area.

2. The method of claim 1, further comprising the step of cooling the polarized area to room temperature after applying the stable electric field.

3. The method of claim 2, further comprising the step of cooling the polarized area below the glass (transition) temperature after applying the stable electric field.

4. The method of claim 1, wherein the stable electric field is a DC electric field.

* * * * *